United States Patent [19]

Akiyama et al.

[11] Patent Number: 4,889,671
[45] Date of Patent: Dec. 26, 1989

[54] PRODUCTION METHOD OF PREFOAMED PARTICLES OF POLYOLEFIN RESIN

[75] Inventors: Hiroyuki Akiyama, Hiratsuka; Susumu Izawa, Utsunomiya; Hideki Kuwabara, Hadano; Toru Yamaguchi, Utsunomiya, all of Japan

[73] Assignee: Japan Styrene Paper Corporation, Tokyo, Japan

[21] Appl. No.: 192,619

[22] Filed: May 11, 1988

[30] Foreign Application Priority Data

May 11, 1987 [JP] Japan .................. 62-114026

[51] Int. Cl.$^4$ .............. C08J 9/22; C08J 9/14; C08J 9/42
[52] U.S. Cl. ..................... 264/53; 264/51; 264/DIG. 9; 264/DIG. 13; 264/DIG. 15; 264/DIG. 16; 521/60
[58] Field of Search ............ 264/53, 51, DIG. 9, 264/DIG. 13, DIG. 15, DIG. 16; 521/60

[56] References Cited

U.S. PATENT DOCUMENTS

| | | | |
|---|---|---|---|
| 4,524,154 | 6/1985 | Maeda et al. | 264/53 X |
| 4,525,485 | 6/1985 | Maeda et al. | 264/53 X |
| 4,676,939 | 6/1987 | Kuwabara | 264/53 X |
| 4,704,239 | 11/1987 | Yoshimura et al. | 264/53 X |

FOREIGN PATENT DOCUMENTS 56-1344 1/1981 Japan .

Primary Examiner—Philip Anderson
Attorney, Agent, or Firm—Sherman and Shalloway

[57] ABSTRACT

Prefoamed particles of a polyolefin resin are produced by dispersing starting particles of the polyolefin resin, which contains a volatile foaming agent, in a dispersant in a pressure vessel, heating the resultant dispersion to a temperature of at least the softening point of the starting particles in said pressure vessel and then opening the vessel at one end thereof so as to release the starting particles and dispersant into an atmosphere of a pressure lower than the internal pressure of the vessel. The release of the starting particles and dispersant is performed while feeding a heating liquid.

6 Claims, 1 Drawing Sheet

PRODUCTION METHOD OF PREFOAMED PARTICLES OF POLYOLEFIN RESIN

BACKGROUND OF THE INVENTION (1) Field of the Invention

This invention relates to a production method of prefoamed particles of a polyolefin resin.

(2) Description of the Related Art

As a prefoaming method of particles of a polyolefin resin, it has been known to disperse particles of a polyolefin resin, which contains a volatile foaming agent, in water in a hermetic vessel, to heat the resultant dispersion under pressure to a temperature of at least the softening point of the particles, and then to release the resin particles and water into an atmosphere of a pressure lower than the internal pressure of the vessel while maintaining the internal pressure of the vessel constant with nitrogen gas (Japanese Patent Publication No. 1344/1981 published Jan. 13, 1981). Excellent prefoamed particles of the polyolefin resin can be obtained by the above method. However, the vacant space becomes greater in the vessel as the resin particle and water are released more and more from the vessel. As a result, the partial pressure of the volatile foaming agent in the vacant space in the vessel is lowered, so that the foaming agent is allowed to escape from the resin particles. Accordingly, the expansion ratio is lowered gradually as the prefoaming proceeds.

Incidentally, as an expansion-molding method making use of prefoamed particles of a polyolefin resin, it may be mentioned to subject the particle to molding either as they are or after an internal pressure is applied to the particles. When molding is conducted using particles having an increased internal pressure thus applied, expansion-molded articles can be obtained generally owing to the high expanding ability of the particles even if prefoamed particles of various expansion ratios are contained in combination. Even when such an internal pressure is applied in advance, there is an inconvenience that the expansion-molded articles have different physical properties. When molding is performed using particles which have not been subjected to the pre-treatment for the application of an internal pressure, the inclusion of prefoamed particles of varied expansion ratios leads to insufficient fusion bonding (primarily, on the side of lower expansion ratios) and/or shrinkage (mainly, on the side of higher expansion ratios) so that desired molded articles cannot be obtained. Whichever method is used, it is not preferable to conduct molding while prefoamed particles of various expansion ratios are included. It has hence been necessary to classify particles depending on their expansion ratios, especially, when molding is carried out using particles which have not been subjected to the pre-treatment for the application of an internal pressure. Such classification has however rendered the process very complex. Improvements have therefore been desired in this respect.

It has also been proposed to perform the release of resin particles while introducing a volatile foaming agent into a vessel, whereby the partial pressure of the volatile foaming agent in the space of the vessel may be kept constant and the expansion ratio of preformed particles, which are to be obtained, may also be maintained substantially constant (European Patent Application No. 95109 published Nov. 30, 1983). The volatile foaming agent is however required in a large amount in order to keep the partial pressure of the volatile foaming agent constant in the space of the vessel from the beginning of foaming until the end thereof.

Chlorofluorocarbon gases are used widely as foaming agents of the above kind for their non-combustibility in spite of their high prices. Reference may be had to the Examples of the European patent application referred to above. Use of chlorofluorocarbon gases in large volumes is however very questionable in view of production cost and ozonosphere destruction. According to this method, liquid dichlorodifluoromethane as cold as $-30°$ C. is introduced by way of example under pressure during prefoaming. As the water level becomes lower in a vessel during the prefoaming, more influence is given by the foaming agent of the low temperature. As a result, the water temperature drops and the foaming temperature can hardly be maintained constant. It is hence unavoidable that the expansion ratio decreases as the foaming of resin particles proceeds.

SUMMARY OF THE INVENTION

With the foregoing in view, the present invention has as a primary object the provision of a method for the production of prefoamed particles of a polyolefin resin, which can prevent escape of a foaming agent from starting resin particles without using a volatile foaming agent such as a chlorofluorocarbon gas like Freon (trade mark; product of E.I. du Pont de Nemours & Company, Inc.) and can also prevent the reduction of the expansion ratio due to a reduction in the temperature of resin particles, thereby making it possible to obtain prefoamed particles of a uniform expansion ratio from the beginning of the foaming until the end thereof.

In one aspect of this invention, there is thus provided a method for producing prefoamed particles of a polyolefin resin by dispersing starting particles of the polyolefin resin, which contains a volatile foaming agent, in a dispersant in a pressure vessel, heating the resultant dispersion to a temperature of at least the softening point of the starting particles in said pressure vessel and then opening the vessel at one end thereof so as to release the starting particles and dispersant into an atmosphere of a pressure lower than the internal pressure of the vessel. The method comprises performing the release of the starting particles and dispersant while feeding a heating liquid.

When the starting resin particles containing the foaming agent is released into the atmosphere of the lower pressure from the vessel so as to allow the starting resin particles to expand, the method of the present invention performs the release while feeding the heating liquid. The volume of a space inside the vessel is therefore maintained almost constant during the foaming step and the partial pressure of the volatile foaming agent in the space of the vessel is not reduced. The method of this invention is therefore free from the potential problem that the expansion ratio may be lowered due to escape of the foaming agent from the starting resin particles. The temperature of the resin particles is not lowered owing to the adoption of feeding of the heating liquid, thereby avoiding the possible problem of a reduction in the expansion ratio due to a drop in temperature. The expansion ratio can therefore be maintained substantially constant from the beginning of the foaming until the end thereof, whereby prefoamed particles having a uniform and high expansion ratio can be obtained.

Even when a foaming agent having a large problem such as a chlorofluorocarbon is used, the method of this invention does not require to use the foaming agent in such a large amount as in the conventional methods. Moreover, the prefoamed particles obtained in accordance with the method of this invention have a high degree of uniformity in expansion ratio and are not varied in expanding ability, without need for classification by expansion ratio. There is hence no problem of insufficient fusion bonding or shrinkage even when molding is performed without the pretreatment for the application of an internal pressure, to say nothing of molding after the application of an internal pressure. The omission of the application step of an internal pressure has a variety of advantageous effects such that the production process of a molded article can be simplified and its production cost is also reduced.

BRIEF DESCRIPTION OF THE DRAWINGS

The above and other objects, features and advantages of the present invention will become apparent from the following description of the invention and the appended claims, taken in conjunction with the accompanying drawings in which:

DETAILED DESCRIPTION OF THE INVENTION AND PREFERRED EMBODIMENTS

Figure 1:
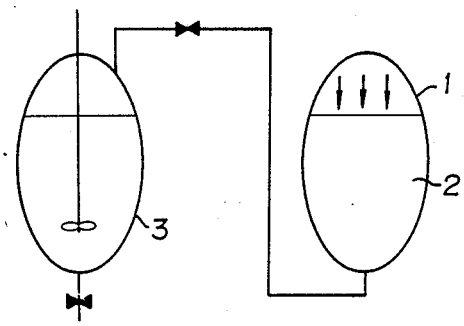
FIG. 1 is a schematic showing one way of feeding a heating liquid.

Illustrative examples of the polyolefin resin useful in the practice of this invention may include linear low-density polyethylene, low-density polyethylene, high-density polyethylene, polypropylene, polybutyrene, ethylene-propylene block copolymers, ethylene-propylene random copolymers, ethylene-vinyl acetate copolymers containing at least 50% of ethylene units, ethylene-styrene copolymers, ethylene-methyl methacrylate copolymers, copolymers of ethylene and other vinyl monomers, etc.

In the present invention, polyolefin resin particles containing a volatile foaming agent are first of all dispersed in a hermetic vessel. The foaming agent can be incorporated in the resin particles by dispersing the polyolefin resin particles and volatile foaming agent in a dispersant within the hermetic vessel. The heating temperature and pressure level in the above procedure vary depending on the type of the resin or the like. As exemplary volatile foaming agents, may be mentioned aliphatic hydrocarbons such as propane, butane, pentane, hexane and heptane; alicyclic hydrocarbons such as cyclobutane and cyclopentane; and halogenated hydrocarbons such as trichlorofluoromethane, dichlorofluoromethane, dichlorodifluoromethane, dichlorotetrafluoroethane, methyl chloride and ethyl chloride. As exemplary dispersants, may be mentioned water, ethylene glycol, glycerin, methanol, ethanol, etc. They may be used either singly or in combination. Water is however used in general. Another dispersant such as aluminum oxide, titanium oxide or calcium carbonate may also be used as needed.

After heating the starting resin particles to a temperature of at least the softening point of the starting resin particles, the vessel is opened at one end thereof so that the starting resin particles and dispersant are released into an atmosphere of a pressure lower than the internal pressure of the vessel (usually, under atmospheric pressure). Here, the internal pressure of the vessel is about 10–35 kg/cm$^2$. Upon release of the starting resin particles and dispersant, a heating liquid is fed, so that the volume of the space and the temperature of the dispersant inside the vessel are maintained substantially constant. It is hence possible to prevent the reduction of the partial pressure of the volatile foaming agent and the variations of the foaming temperature, whereby prefoamed particles having a uniform and high expansion ratio can be obtained from the beginning of the foaming until the end thereof.

As illustrative examples of the heating liquid, may be mentioned those referred to above as exemplary dispersants. Water is however used in general. The temperature of the heating liquid may preferably be within a range of from ($T_m$- 20° C.) to ($T_m$- 5° C.) in which $T_m$ means the melting completion temperature of the starting resin particles as determined from a DSC curve in their differential scanning calorimetry, specifically, the final temperature of an endothermic curve obtained when an about 6–8 mg sample of the starting resin particles is heated at a rate of 10° C./min by differential scanning calorimetry.

Figure 2:
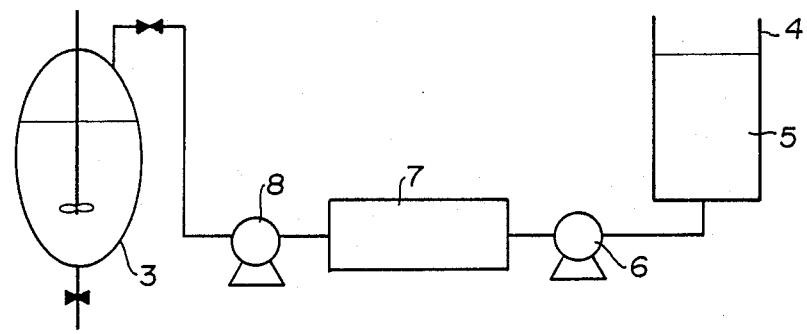
FIG. 2 is a schematic showing another way of feeding a heating liquid.

The feeding rate of the heating liquid may preferably be set within a range of from 400 l/min to 20 l/min in such a way that the heating liquid is fed in a volume nearly equal to the total volume of the vessel contents which have been released. The term "a volume nearly equal to the total volume of the starting particles and dispersant which have been released" means that the feed rate of the heating liquid per minute is within about ±20% of the release rate of the starting particles and dispersant per minute." As a method for feeding the heating liquid, reference is now made to FIGS. 1 and 2 of the accompanying drawings. According to the method illustrated by way of in FIG. 1, the interior of a reservoir 1 is pressurized with air or the like so that a heating liquid 2 stored inside the reservoir 1 is pushed out to a foaming tank 3. In an alternative method shown in FIG. 2, a liquid 5 stored inside a tank 4 is fed by a pump 6 to a heating zone 7, where the liquid 5 is heated. The thus-heated liquid is thereafter fed further by another pump 8 to the foaming tank 3.

It is desirable to continue the feeding of the heating liquid until at least three-fourths of the initial charge of the starting particles is released from the foaming tank.

The prefoamed particles obtained in accordance with the method of this invention are used for the so-called expansion molding method, in which they are filled in a mold and then heated to undergo foaming. Since the prefoamed particles obtained in accordance with the method of this invention have a high degree of uniformity in expansion ratio, their expanding ability vary little. When they are molded, all the particles foam equally, and neither unfoamed particles nor those shrunk subsequent to their foaming are included. They are hence very useful when molding is performed without the pretreatment for the application of an internal pressure.

The method of this invention has a further advantage. Owing to the above-mentioned high degree of uniformity in expansion ratio, the prefoamed particles obtained by the method of this invention do not require shifting in accordance with their expansion ratios upon their molding unlike the conventional methods.

EXAMPLES

This invention will hereinafter be described in further detail by the following Examples.

EXAMPLES 1-6

Resin particle samples shown in Table 1 were each dispersed along with its corresponding foaming agent, also given in Table 1, and 200 g of aluminum oxide in 200 l of water in a hermetic vessel. After separately heating the resultant dispersion to its corresponding temperature shown in Table 1 and holding the dispersion at the same temperature, the resin particles were released under atmospheric pressure along with their associated heated water in their corresponding volume per minute given in Table 1 while feeding the vessel with heating water of the corresponding temperature and volume given in Table 1, whereby the prefoaming of the resin particles was effected. The expansion ratio of the prefoamed particles thus obtained was measured periodically. Results are shown in Table 2. After allowing the prefoamed particles to stand for 48 hours under atmospheric pressure and hence aging them, there were filled in a mold without applying any pre-treatment for the application of an internal pressure and were then heated with steam of their corresponding pressure shown in Table 2. Properties of articles molded in the above manner are also shown in Table 2.

COMPARATIVE EXAMPLES 1 & 2

Prefoaming operations were carried out in the same manner as in Examples 1 and 3 respectively, except that the release of resin particles was performed without feeding the vessel with heating water (release time: 10 minutes in Comparative Example 1; 5 minutes in Comparative Example 2). The expansion ratios of prefoamed particle samples thus obtained are shown in Table 2. After separately aging the prefoamed particle samples in the same manner as in Examples 1-6, they were filled in separate molds without applying any pre-treatment for the application of an internal pressure and were then heated with steam of their corresponding pressures shown in Table 2. Properties of articles thus molded are also shown in Table 2.

TABLE 1

| | Example | | | | | |
|---|---|---|---|---|---|---|
| | 1 | 2 | 3 | 4 | 5 | 6 |
| Resin | | | | | | |
| Kind | Ethylene-propylene random copolymer (ethylene content: 2.5 wt. %) | Ethylene-propylene random copolymer (ethylene content: 2.5 wt. %) | Ethylene-propylene random copolymer (ethylene content: 2.5 wt. %) | Linear low-density polyethylene | Linear low-density polyethylene | Ethylene-propylene random copolymer (ethylene content: 2.5 wt. %) |
| Softening point (°C.) | 131 | 131 | 131 | 95 | 95 | 131 |
| Melting completion temp. (°C.) | 160 | 160 | 160 | 126 | 126 | 160 |
| Amount (kg) | 100 | 100 | 100 | 100 | 100 | 100 |
| Foaming agent | | | | | | |
| Kind | Dichlorodifluoromethane | Dichlorodifluoromethane | Butane | Butane | Dichlorodifluoromethane | Dichlorodifluoromethane |
| Amount (kg) | 22 | 18 | 8 | 13 | 22 | 13 |
| Heating temperature of resin particles in vessel (foaming temperature) (°C.) | 145 | 145 | 145 | 110 | 110 | 147 |
| Heating water fed | | | | | | |
| Temperature (°C.) | 145 | 145 | 145 | 110 | 110 | 147 |
| Amount fed (l/min) | 30 | 40 | 60 | 40 | 60 | 50 |
| Released volume (l/min) | 30 | 40 | 60 | 40 | 60 | 50 |
| Released (feeding) time (min) | 30 | 24 | 16 | 25 | 18 | 12 |

TABLE 2

| | Expansion ratio of prefoamed particles* | | | | Molding steam ($kg/cm^2 \cdot G$) | Properties of molded article | | |
|---|---|---|---|---|---|---|---|---|
| | $0-\frac{1}{4} \cdot t$ | $\frac{1}{4} \cdot t - \frac{1}{2} \cdot t$ | $\frac{1}{2} \cdot t - \frac{3}{4} \cdot t$ | $\frac{3}{4} \cdot t - t$ | | Shrinkage factor along surface | Thicknesswise shrinkage factor | Secondary expandability |
| Example | | | | | | | | |
| 1 | 45 ± 2 | 45 ± 2 | 45 ± 2 | 45 ± 2 | 3.2 | O | O | O |
| 2 | 30 ± 2 | 30 ± 2 | 30 ± 2 | 30 ± 2 | 3.2 | O | O | O |
| 3 | 16 ± 2 | 16 ± 2 | 16 ± 2 | 16 ± 2 | 3.2 | O | O | O |
| 4 | 28 ± 2 | 28 ± 2 | 28 ± 2 | 28 ± 2 | 1.4 | O | O | O |
| 5 | 20 ± 2 | 20 ± 2 | 20 ± 2 | 20 ± 2 | 1.4 | O | O | O |
| 6 | 19 ± 2 | 19 ± 2 | 19 ± 2 | 19 ± 2 | 3.2 | O | O | O |
| Comp. Ex. | | | | | | | | |
| 1 | 45 ± 2 | 47 ± 2 | 45 ± 2 | 35 ± 2 | 3.5 | Δ | Δ | Δ |
| 2 | 16 ± 2 | 18 ± 2 | 16 ± 2 | 12 ± 2 | 3.5 | O | O | X |

*t: released time
In $0-\frac{1}{4} \cdot t$, $\frac{1}{4} \cdot t - \frac{1}{2} \cdot t$, $\frac{1}{2} \cdot t - \frac{3}{4} \cdot t$ and $\frac{3}{4} \cdot t - t$, and left-had figures are not included.

In Table 2, the shrinkage factors along surface, the thicknesswise shrinkage factors and secondary expandability were determined and ranked in the following manner.

Shrinkage Factor Along Surface

Each molded article immediately after its molding was aged at 60° C. for 24 hours and was then allowed to stand at room temperature for 24 hours. The dimensions of the molded article were thereafter measured. The shrinkage factor along surface of the molded article was ranked in accordance with the following standard.

| Shrinkage factor | Rank |
| --- | --- |
| Smaller than 3% | O |
| 3–5% | Δ |
| Greater than 5% | X |

Thicknesswise Shrinkage Factor

Each molded article immediately after its molding was aged at 60° C. for 24 hours and was then allowed to stand at room temperature for 24 hours. The dimensions of the molded article were thereafter measured at a central part thereof. The thicknesswise shrinkage factor of the molded article was ranked in accordance with the following standard.

| Shrinkage factor | Rank |
| --- | --- |
| Smaller than 3% | O |
| 3–5% | Δ |
| Greater than 5% | X |

Secondary Expandability

Each molded article was externally observed and the secondary expandability was ranked in accordance with the following standard.

| | |
| --- | --- |
| Smooth surfaces and good fusion bonding | O |
| Some voids were contained but fusion bonding was good | Δ |
| Many voids were contained | X |

We claim:

1. A method for producing prefoamed particles of a polyolefin resin by dispersing starting particles of the polyolefin resin, which contains a volatile foaming agent, in a dispersant in a pressure vessel, heating the resultant dispersion to a temperature of at least the softening point of the starting particles in said pressure vessel and then opening the vessel at one end thereof so as to release the starting particles and dispersant into an atmosphere of a pressure lower than the internal pressure of the vessel, which comprises feeding a heating liquid into the vessel while the starting particles and the dispersant are being released, thereby minimizing a change in the partial pressure of the volatile foaming agent.

2. The method as claimed in claim 1, wherein the release of the starting particles and dispersant is performed while feeding the heating liquid into the pressure vessel in a volume nearly equal to the total volume of the starting particles and dispersant which have been released.

3. The method as claimed in claim 1 or 2, wherein the temperature of the heating liquid ranges from ($T_m$- 20° C.) to ($T_m$- 5° C.) in which $T_m$ means the melting completion temperature of the starting particles.

4. The method as claimed in claim 1, 2 or 3, wherein the heating liquid is fed at a rate of from 400 l/min to 20 l/min.

5. The method as claimed in claim 1, wherein the feeding of the heating liquid is continued until at least three-fourths of the initial charge of the starting particles is released.

6. The method as claimed in claim 1, wherein the polyolefin resin is an ethylenepropylene random copolymer.

* * * * *

UNITED STATES PATENT AND TRADEMARK OFFICE
CERTIFICATE OF CORRECTION

PATENT NO. : 4,889,671

DATED : December 26, 1989

INVENTOR(S) : HIROYUKI AKIYAMA ET AL.

It is certified that error appears in the above-identified patent and that said Letters Patent is hereby corrected as shown below:

Claim 4, line 1 of the claim, "2 or 3," should be deleted.

Signed and Sealed this

Seventh Day of May, 1991

*Attest:*

HARRY F. MANBECK, JR.

*Attesting Officer*      *Commissioner of Patents and Trademarks*